United States Patent
Schmidt et al.

(10) Patent No.: US 9,199,398 B2
(45) Date of Patent: Dec. 1, 2015

(54) PROCESS FOR PRODUCING COATED MOLDED BODIES

(75) Inventors: Arne Schmidt, Darmstadt (DE); Marc Poth, Reinheim (DE); Frank Gabriel, Darmstadt (DE); Antonios Manis, Darmstadt (DE); Klaus Koralewski, Riedstadt (DE); Sven Schroebel, Darmstadt (DE); Martin Eichlseder, Tettenweis (DE)

(73) Assignees: Evonik Röhm GmbH, Darmstadt (DE); Kraussmaffei Technologies GmbH, München (DE)

( * ) Notice: Subject to any disclaimer, the term of this patent is extended or adjusted under 35 U.S.C. 154(b) by 373 days.

(21) Appl. No.: 13/579,048

(22) PCT Filed: Dec. 15, 2010

(86) PCT No.: PCT/EP2010/069696
§ 371 (c)(1),
(2), (4) Date: Aug. 15, 2012

(87) PCT Pub. No.: WO2011/101057
PCT Pub. Date: Aug. 25, 2011

(65) Prior Publication Data
US 2012/0321857 A1    Dec. 20, 2012

(30) Foreign Application Priority Data
Feb. 19, 2010   (DE) .......................... 10 2010 002 164

(51) Int. Cl.
| | | |
|---|---|---|
| B29C 45/16 | (2006.01) |
| B29C 37/00 | (2006.01) |
| B29C 45/37 | (2006.01) |
| B29C 45/56 | (2006.01) |
| B29K 33/00 | (2006.01) |

(52) U.S. Cl.
CPC ......... B29C 45/1679 (2013.01); B29C 37/0028 (2013.01); B29C 37/0053 (2013.01); B29C 45/372 (2013.01); B29C 45/561 (2013.01); B29C 2045/563 (2013.01); B29K 2033/12 (2013.01); B29K 2995/003 (2013.01); B29K 2995/0022 (2013.01); B29K 2995/0024 (2013.01); Y10T 428/24612 (2015.01)

(58) Field of Classification Search
None
See application file for complete search history.

(56) References Cited

U.S. PATENT DOCUMENTS

| | | |
|---|---|---|
| 8,227,549 B2 | 7/2012 | Schultes et al. |
| 8,268,939 B2 | 9/2012 | Ebbrecht et al. |
| 2007/0055017 A1 | 3/2007 | Schultes et al. |
| 2007/0222117 A1 | 9/2007 | Hoess et al. |
| 2008/0132627 A1 | 6/2008 | Schultes et al. |
| 2009/0085235 A1 | 4/2009 | Burkle et al. |
| 2010/0098907 A1 | 4/2010 | Schultes et al. |
| 2010/0167045 A1 | 7/2010 | Schultes et al. |
| 2010/0213636 A1 | 8/2010 | Schmidt et al. |
| 2011/0230610 A1 | 9/2011 | Schultes et al. |
| 2012/0015141 A1 | 1/2012 | Hoess et al. |
| 2012/0322932 A1 | 12/2012 | Schultes et al. |

FOREIGN PATENT DOCUMENTS

| | | |
|---|---|---|
| CA | 2 703 041 A1 | 4/2009 |
| DE | 102007051482 A1 * | 4/2009 |
| EP | 1 705 152 | 9/2006 |
| JP | 57-036607 | 2/1982 |
| JP | 9-239739 | 9/1997 |
| JP | 11-333849 A | 12/1999 |
| JP | 2003 19731 | 1/2003 |
| JP | 2005-103794 | 4/2005 |
| TW | 200633840 A | 10/2006 |
| TW | 200932483 A | 8/2009 |
| WO | 2009 053130 | 4/2009 |

OTHER PUBLICATIONS

U.S. Appl. No. 13/824,624, filed Apr. 18, 2013, Khrenov, et al.
"nanoskin—Bestaendige Nanostrukturen and Funktionalisierung im Prozess," Fraunhofer-Institut fuer Werkstoffmechanik, XP002647625, pp. 1-4, (Oct. 17, 2009).
International Search Report Issued Jul. 22, 2011 in PCT/EP10/69696 Filed Dec. 15, 2010.
U.S. Appl. No. 14/412,477, Jan. 2, 2015, Frank, et al.
Office Action and Search Report issued on Dec. 19, 2014 in the corresponding Taiwanese Patent Application No. 100105072 (English Translation only).
Office Action issued on Dec. 8, 2014 in the corresponding Japanese Patent Application No. 2012-553200 (English Translation only).
Decision of Refusal as Received in the Japanese Patent Application No. 2012-553200 dated Aug. 10, 2015 (English Translation only).

* cited by examiner

*Primary Examiner* — Benjamin Schiffman
(74) *Attorney, Agent, or Firm* — Oblon, McClelland, Maier & Neustadt, L.L.P.

(57) ABSTRACT

The present invention relates to a process for producing coated mouldings with fully or partly structured surfaces. The present invention additionally describes a system for performing this process.

14 Claims, No Drawings

PROCESS FOR PRODUCING COATED MOLDED BODIES

CROSS-REFERENCE TO RELATED APPLICATIONS

This application is a National Stage of PCT/EP 10/069696 filed Dec. 15, 2010 and claims the benefit of DE 10 2010 002 164.4 filed Feb. 19, 2010.

The present invention relates to a process for producing coated mouldings with fully or partly structured surfaces. The present invention additionally describes a system for performing this process.

BACKGROUND OF THE INVENTION

1. Field of the Invention

Thermoplastic polymer moulding materials, which may be based, for example, on polymethyl methacrylate (PMMA), are used for a wide variety of different applications. For this purpose, the materials are extruded or injection-moulded to give mouldings.

2. Description of Background Art

Mouldings are nowadays used widely for production of parts subject to high stress, for example movable parts (automobile interiors and exteriors, covers for electronic devices such as covers for mobile phones, computers, organizers, MP3 players or televisions), opaquely coloured installable components (for example in the automotive industry: exterior mirrors, pillar trim, mirror triangles), or opaquely coloured everyday items. Owing to high stress, the surface of the mouldings thus used tends to form scratches, which in many cases are unacceptable for visual reasons. In this context, mouldings which have been produced by means of injection moulding are particularly scratch-sensitive. Furthermore, further properties of the mouldings can be altered by a modification of the surface. For example, a moulding can be provided with a hydrophobic or hydrophilic coating in order, for example, to alter wettability with water or other liquids. In addition, the surface of a moulding can be configured so as to be reflective or to reduce reflection. Furthermore, these mouldings may also have soil-repellent or antibacterial properties, which are in many cases achieved by a modification of the surface.

To improve scratch resistance, to modify the hydrophobicity/hydrophilicity of the surface and the reflection properties, and to provide the surfaces with antimicrobial and/or soil-repellent properties, the mouldings detailed above can be provided with paint layers. However, the conventional application of reactive paints is relatively complex and therefore costly.

For this reason, there has already been development of processes by which a scratch-resistant layer can be applied to the mouldings relatively inexpensively by means of injection moulding processes. For example, publications JP 11300776 and JP 2005074896 describe injection moulding processes in which a moulding with a scratch-resistant layer is obtained.

Publication JP 11300776 (Dainippon Toryo, 1998) describes a two-stage RIM process. First, metathesis RIM of dicyclopentadiene gives a moulding. After hardening, the moving part of the RIM mould is retracted, so as to give rise to a defined gap between moulding and mould. In a second RIM process, a coating material is injected into this gap, consisting of acrylic-functionalized urethane oligomers, styrene, diacrylate crosslinkers and optionally fillers and pigments (TiO$_2$, talc), and cured by free-radical means at 95° C. for 2 min.

Document JP 2005074896 (Toyota Motor Corp.; Dainippon Toryo Co.) likewise describes an RIM process. In a first, conventional injection moulding step, a polymer, especially polycarbonate (PC), is processed to give a flat moulding. The mould subsequently opens up to form a narrow gap, and a reactive solution composed of acrylate-functionalized urethane oligomers, acrylate crosslinkers, inhibitors and an organic peroxide initiator is injected within a few seconds and cured. At 95° C., curing is complete after a few seconds, and the composite is demoulded after 90 s. It has good scratch resistance, bond strength, and thermal cycling and warm water cycling stability. Obligatory in all cases is the presence of a urethane oligomer which is formed from isophorone diisocyanate or bis(isocyanocyclohexyl)methane units.

The mouldings detailed above already have good properties. However, the production is time-consuming, and so the process is costly overall. Premature polymerization of the reactive mixture in the injection moulding apparatus constitutes a further problem with the injection moulding process described in publications JP 11300776 and JP 2005074896, such that it is barely possible to achieve short cycle times by means of these processes in mass production.

Furthermore, problems occur in many cases with the service lives of the system, since the injection moulds are in many cases not sufficiently impervious to the reaction mixtures, such that they can come into contact with moving parts of the system.

The long cycle times detailed above can additionally lead to quality problems with the mouldings produced. In this regard, it should be noted that the moulding materials are subject to thermal stress in the injection moulding apparatus, which can lead to degradation of the polymers. This can alter, for example, the mechanical and optical properties of the moulding materials, for example the colour, and as a result also those of the mouldings.

For particular applications, it is advantageous when the surface is structured. The production of structured surfaces by means of injection moulding technology is known. In this context, in the injection embossing technique, a mould provided with the appropriate structure reproduces the structure in the polymeric carrier material. A disadvantage is the wear on the structures embossed in the polymer material during use, or during cleaning operations.

As described above, these structured mouldings can subsequently be provided, for example, with a scratch-resistant coating. However, the coating applied subsequently lead to loss of the structure.

In order to counteract this, the structure can be embossed into the scratch-resistant coating in a downstream embossing step.

These additional process steps considerably increase the manufacturing costs.

Furthermore, there is continuing effort to improve the scratch resistance and the weathering stability of the mouldings thus obtained. In addition, there is a need to specify a process for surface modification of mouldings, by means of which the surface properties of mouldings can be matched to a wide variety of different requirements. For instance, the process should especially enable the production of hydrophobic or hydrophilic coatings in order, for example, to alter wettability with water or other liquids. Furthermore, the process should enable reflective coating or a reduction in reflection of the surface. In addition, it should be possible to configure the moulding with soil-repellent or antibacterial properties.

BRIEF SUMMARY OF THE INVENTION

In view of the prior art, it was thus an object of the present invention to provide a process for producing coated mouldings, which can be performed in a simple and inexpensive manner. At the same time, the moulding should be obtained with minimum cycle times and, viewed overall, with relatively low energy consumption.

It was a further object to provide a process with which the moulding surface can be configured very variably both with regard to technical aspects and with regard to the visual appearance.

Furthermore, it should be possible by virtue of the process to obtain mouldings with outstanding mechanical properties. More particularly, the mouldings should exhibit a high scratch resistance and hardness. Furthermore, the coated mouldings should have a high weathering and chemical resistance. Furthermore, the process should be able to produce mouldings with a high precision and uniform high quality.

Furthermore, the process should enable a very long service live of an injection moulding system.

DETAILED DESCRIPTION OF THE INVENTION

The objects were achieved by a novel process, by means of which coated mouldings can be produced with structured and multifunctional surfaces alongside high-gloss surfaces. More particularly, it is possible to produce mouldings which have multifunctional nanostructured surfaces and multifunctional high-gloss surfaces. The process according to the invention is notable in that it is performed in only one closed mould. One form of the production process is the combination of an injection moulding process step and of a subsequent expansion-flooding-embossing process step. A particular feature of the process according to the invention is that it is performed without changing the mould.

In the context of the present invention, multifunctional surfaces describe the multiply variable configuration of the coating, for example with additives. According to the invention, mouldings are obtained with outstanding mechanical properties by the process according to the invention. More particularly, the mouldings, by virtue of the coating applied in accordance with the invention, exhibit a high scratch resistance and hardness. Furthermore, the surface properties of mouldings can be adjusted by to a multitude of different requirements. For instance, the process may serve especially for production of hydrophobic or hydrophilic coatings, in order, for example, to alter wettability with water or other liquids. Furthermore, reflective coating or a reduction in reflection of the surface can be achieved. In addition, a moulding can be configured with soil-repellent or antibacterial properties by the process according to the invention. Furthermore, the coated mouldings have a high weathering and chemical resistance. Moreover, the process can produce mouldings with a high precision and uniform high quality. For instance, mouldings obtainable by the process according to the invention exhibit essentially no cracks or similar defects. In addition, these mouldings have a high surface quality.

The process according to the invention specifically comprises the following process steps:

1.) A moulding material is injected at a temperature between 220 and 330° C. into an injection mould with a fully or partly structured inner surface, and cooled to the demoulding temperature of the moulding material, preferably to 70 to 90° C., to obtain a moulding.
2.) The injection mould is altered so as to give rise to an intermediate space having a thickness between 2 μm and 500 μm, preferably between 5 μm and 80 μm, between surface of the moulding to be coated and the inner surface of the injection mould.
3.) The resulting intermediate space is filled fully or partly with a reactive mixture by liquid injection.
4.) The mould is closed again and heated to a temperature between 80 and 140° C., preferably between 100 and 140° C., within not more than 20 seconds, preferably in a period between 5 and 8 seconds.
5.) The mould is subsequently cooled again and opened, and the coated moulding is removed.

In an optional embodiment, before the liquid injection of process step 3.), the cavity is replaced by a different cavity. This means that the liquid injection of the moulding in process step 1.) and of the coating of process step 3.) are performed with different cavities. The machine parts required for that purpose are preferably replaced by means of a sliding table.

The reactive mixture of process step 3.) is a formulation comprising at least 40% by weight of a di(meth)-acrylate, at least 10% by weight of a tri-, tetra- or penta(meth)acrylate, and 0.01 to 3.0% by weight of a thermal initiator.

Optionally, it is also possible for 0.05% by weight to 0.2% by weight of a lubricant to be present. However, the process according to the invention is preferably performed without lubricant. It has been found that, surprisingly, wall adhesion after the crosslinking is sufficiently low even without lubricants present in the reactive mixture and without mould release agents. It is thus possible to remove the moulding without residues.

Particular advantages are achieved especially with reactive mixtures which comprise at least 40% by weight, preferably at least 60% by weight, of cross-linking (meth)acrylates with two double bonds, based on the total weight of the reactive mixture. The term "double bond" refers especially to carbon-carbon double bonds which are free-radically polymerizable. These include especially (meth)acrylates which derive from unsaturated alcohols, for example 2-propynyl (meth)-acrylate, allyl (meth)acrylate, vinyl (meth)acrylate, and (meth)acrylates which derive from diols or higher polyhydric alcohols, for example glycol di(meth)-acrylates, such as ethylene glycol di(meth)acrylate, diethylene glycol di(meth)acrylate, triethylene glycol di(meth)acrylate, tetra- and polyethylene glycol di(meth)acrylate, 1,3-butanediol (meth) acrylate, 1,4-butanediol (meth)acrylate, 1,6-hexanediol di(meth)-acrylate, glyceryl di(meth)acrylate and diurethane dimethacrylate.

Particularly preferred (meth)acrylates having at least two double bonds are especially 1,6-hexandiol diacrylate, trimethylolpropane triacrylate, pentaerythritol tetraacrylate and dipentaerythritol pentaacrylate.

In addition, the reactive mixture comprises at least one (meth)acrylate having three or more double bonds. The proportion of (meth)acrylates having three or more double bonds is preferably at least 10% by weight, more preferably at least 25% by weight, based on the weight of the reactive mixture.

In a particular embodiment, the reactive mixture comprises preferably 1,6-hexanediol diacrylate, trimethylolpropane triacrylate and/or pentaerythritol tetraacrylate. Of particular interest are especially reactive mixtures which comprise trimethylolpropane triacrylate and pentaerythritol tetraacrylate, where the weight ratio of trimethylolpropane triacrylate to pentaerythritol tetraacrylate may preferably be in the range from 10:1 to 1:10, more preferably in the range from 5:1 to 1:5, especially preferably in the range from 3:1 to 1:3 and most preferably in the range from 2:1 to 1:2.

In a further configuration, the reactive mixture comprises preferably trimethylolpropane triacrylate and 1,6-hexanediol diacrylate, where the weight ratio of trimethylolpropane triacrylate to 1,6-hexanediol diacrylate is preferably in the range from 10:1 to 1:10, more preferably in the range from 5:1 to 1:5, especially preferably in the range from 3:1 to 1:3 and most preferably in the range from 2:1 to 1:2.

Reactive mixtures of particular interest are also those which preferably comprise pentaerythrityl tetraacrylate and 1,6-hexanediol diacrylate. The weight ratio of pentaerythritol tetraacrylate to 1,6-hexanediol diacrylate may appropriately be in the range from 10:1 to 1:10, preferably in the range from 5:1 to 1:5, especially preferably in the range from 3:1 to 1:3 and most preferably in the range from 2:1 to 1:2.

Reactive mixtures which comprise pentaerythritol tetraacrylate and/or trimethylolpropane triacrylate surprisingly exhibit a particularly high scratch resistance, which increases especially with the proportion of pentaerythritol tetraacrylate. Reactive mixtures which comprise 1,6-hexanediol diacrylate and/or trimethylolpropane triacrylate exhibit a particularly high UV stability, which can be determined especially by the xenon test. For instance, mixtures with a high proportion of 1,6-hexanediol diacrylate retain a high scratch resistance according to the friction wheel test, even after xenon irradiation.

One factor effecting the scratch resistance of the coating is the number of polymerizable double bonds, based on the weight of the mixture. The higher this proportion, the higher the scratch resistance that the coating can achieve. The reactive mixture may accordingly comprise preferably at least 1 mol of double bond per 120 g of reactive mixture, more preferably at least 1 mol of double bond per 105 g of reactive mixture. In this context, scratch resistance can be enhanced especially by the use of (meth)acrylates having three or more double bonds.

For curing, the reactive mixture comprises at least one initiator by which the monomers can be free-radically polymerized. In this context, thermal initiators which form free radicals by the action of heat are used.

Suitable thermal initiators include azo compounds, peroxy compounds, persulphate compounds or azoamidines. Non-limiting examples are dibenzoyl peroxide, dicumyl peroxide, cumene hydroperoxide, diisopropyl peroxydicarbonate, bis (4-tert-butylcyclohexyl) peroxydicarbonate, dipotassium persulphate, ammonium peroxydisulphate, 2,2"-azobis(2-methylpropionitrile) (AIBN), 2,2"-azobis(isobutyramidine) hydrochloride, benzopinacol, dibenzyl derivatives, methyl ethylene ketone peroxide, 1,1-azobiscyclohexanecarbonitrile, methyl ethyl ketone peroxide, acetylacetone peroxide, dilauroyl peroxide, didecanoyl peroxide, tert-butyl 2-ethylperhexanoate, ketone peroxide, methyl isobutyl ketone peroxide, cyclohexanone peroxide, dibenzoyl peroxide, tert-butyl peroxybenzoate, tert-butyl peroxyisopropylcarbonate, 2,5-bis(2-ethylhexanoylperoxy)-2,5-dimethylhexane, tert-butyl 2-ethylperoxyhexanoate, tert-butyl 3,5,5-trimethylperoxyhexanoate, tert-butyl peroxyisobutyrate, tert-butyl peroxyacetate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, and also the free-radical generators obtainable from DuPont under the ®Vazo name, examples being ®Vazo V50 and ®Vazo WS.

The reactive mixture may appropriately comprise 0.01% by weight to 3% by weight, preferably 0.1% by weight to 2.5% by weight and especially preferably 0.5% by weight to 1.5% by weight, of thermal initiator, based on the weight of the reactive mixture.

As already explained, the reactive mixture may optionally comprise a lubricant. According to the composition, this is successful in improving the demouldability of the coated moulding, without reducing the adhesive strength to critical values. Auxiliaries that may be present accordingly include lubricants, e.g. those selected from the group of the polysiloxanes, of the saturated fatty acids having fewer than 20 carbon atoms, preferably 16 to 18 carbon atoms, or of the saturated fatty alcohols having fewer than 20 carbon atoms, preferably 16 to 18 carbon atoms. It is preferable that small proportions are present, at most 0.25% by weight, based on the weight of the reactive mixture, for example 0.05 to 0.2% by weight. Suitable examples are stearic acid, palmitic acid, and industrial mixtures composed of stearic and palmitic acid. Acrylated polysiloxanes are additionally appropriate, one example being 13/6/αω2-hexylacryloylsiloxane, and this compound can be obtained, for example, under the RC 725 trade name from Goldschmidt GmbH. Larger amounts of polysiloxanes can also be used. By way of example, proportions of at most 10% by weight are appropriate, preferably at most 1% by weight and most preferably at most 0.5% by weight. Examples of other suitable compounds are n-hexadecanol and n-octadecanol, and also industrial mixtures composed of n-hexadecanol and n-octadecanol. Stearyl alcohol is a particularly preferred lubricant.

The reactive mixture may also include conventional additives, such as colourants, pigments, e.g. metallic pigments, UV stabilizers, fillers or nanomaterials, in particular ITO nanoparticles. The proportion of these additives depends on the intended application and can therefore be within a wide range. This proportion may preferably be 0 to 30% by weight, more preferably 0.1 to 5% by weight, if additives are present.

Furthermore, the process enables a long service life of an injection moulding system. It is surprisingly possible, especially by virtue of the temperature increase for curing of the reactive mixture, to achieve a higher imperviosity of the system. It is essential here that the moving parts of the injection moulding system are not impaired by the curing of the reactive mixture. This is surprising especially because the viscosity of the reactive mixture typically decreases in the course of heating, such that the reactive mixture is typically more free-flowing at higher temperatures. Furthermore, by virtue of the inventive configuration, thermal degradation of the moulding materials in the injection moulding system can be minimized, such that mouldings are obtained with a high, uniform quality.

Injection moulding processes have been known for some time and are used widely. In general, a moulding material is injected here into an injection mould and cooled to obtain a moulding.

According to the invention, the coating is advantageously effected by an alteration of the injection mould to give rise to an intermediate space between surface of the moulding to be coated and the inner surface of the injection mould. The intermediate space formed can be filled with a reactive mixture by injection moulding.

The steps detailed above are discussed in more detail inter alia in publications JP 11300776 and JP 2005074896, which are incorporated into the application for the purposes of disclosure.

By means of the process according to the invention, it is possible in an unforeseeable manner to perform a process for producing coated mouldings, which can be performed in a simple and inexpensive manner. At the same time, the moulding can be obtained with very short cycle times and, viewed overall, with relatively low energy consumption.

It has been found that, surprisingly, the process according to the invention can provide fully or partly structured mouldings with functional coatings. For the first time, it is possible in a process to reproduce structures of any configuration in a functional layer. It has been found that structured mouldings with a scratch-resistant coating can be produced. The mouldings produced in accordance with the invention after the coating preferably have shiny surface regions with scratch-resistant coating and/or structured, non-shiny surface regions with scratch-resistant coating. The coated moulding preferably has both shiny and structured regions on the surface. The thickness of the coatings is in the range from 1 µm to 200 µm, preferably between 5 µm and 80 µm.

Moulding materials for production of the mouldings to be coated are known per se, and these moulding materials comprise thermoplastically processable polymers as an obligatory component. The preferred polymers include, for example, poly(meth)acrylates, especially polymethyl methacrylate (PMMA), poly(meth)acrylimides, polyacrylonitriles, polystyrenes, polyethers, polyesters, polycarbonates, polyvinyl chlorides. Preference is given here to poly(meth)acrylates and poly(meth)-acrylimides. These polymers may be used individually or else as a mixture. In addition, these polymers may also be in the form of copolymers. Preferred copolymers include styrene-acrylonitrile copolymers, styrene-maleic acid copolymers and polymethyl methacrylate copolymers, especially polymethyl methacrylate-poly(meth) acrylimide copolymers.

The inventive moulding materials comprise at least 50% by weight of polymethyl methacrylate, polymethacryl-methylimide and/or polymethyl methacrylate copolymers.

The moulding materials may comprise customary additives and admixtures. In particular, the moulding materials may comprise silicone rubber graft copolymers or acrylate rubber modifiers to improve the impact resistant values to the moulding materials. These additives additionally include molecular weight regulators, release agents, antistats, antioxidants, demoulding agents, flame retardants, lubricants, dyes, flow improvers, fillers, light stabilizers, pigments, weathering stabilizers and plasticizers. The additives are used in a customary amount, i.e. up to 80% by weight, preferably up to 30% by weight, based on the overall composition. When the amount is greater than 80% by weight, based on the overall composition, properties of the polymers, for example processability, may be disrupted.

In the context of the present invention, reactive mixtures refer to compositions which can be cured by free-radical polymerization. Under conditions of injection moulding, these compositions can be injected into the injection mould, such that these compositions are at least temporarily free-flowing under these conditions. Reactive mixtures which can be used for coating are detailed inter alia in publications JP 11300776 and JP 2005074896. These publications are referred to for reasons of disclosure, and the compositions described in these publications are incorporated into the present application. Particularly suitable reactive mixtures are those disclosed in DE 102007028601.

The reactive mixture can be used especially in reactive injection moulding processes. Accordingly, the mixture has a viscosity which enables such a use. The dynamic viscosity of the reactive mixture is preferably in the range from 1 to 200 mPa*s at 25° C., more preferably in the range from 5 to 50 mPa*s at 25° C., the dynamic viscosity being determinable according to Brookfield (with a UL adapter).

The temperature of the first process step, in which the moulding material is injected into the injection mould, depends especially on the type of polymer and of the additives. These processing temperatures are known to those skilled in the art. In general, the moulding material is injected into the injection mould at a temperature in the range from 150 to 350° C., preferably 220 to 330° C.

The subsequent cooling temperature of the mould in the first process step can likewise be set to the temperature customary for the particular moulding material. The moulding material can preferably be cooled to a temperature in the range from 40 to 160° C., more preferably 60 to 120° C. and most preferably 70 to 90° C., before the reaction mixture is injected into the intermediate space.

The temperature at which the thermal curing of the reactive mixture is effected in process step 4 depends on the type of thermal initiator. Of particular interest are especially processes in which the thermal curing is effected preferably at a temperature in the range from 60 to 180° C., preferably 70 to 160° C. and most preferably in the range of 80 to 140° C. in the injection mould. If the temperature in the course of thermal curing is too high, formation of cracks may occur. In the case of excessively low temperatures, the coating in many cases exhibits excessive adhesion to the metal of the injection mould, and scratch resistance can also be increased in some case by a higher temperature in the course of thermal curing.

According to the invention, the reaction mixture is cured by increasing the temperature of at least one part of the injection mould. Surprisingly, it is thus possible to cure the coating without any adverse effect on the moulding obtained at first. Particularly advantageously, the injection mould is heated only partly to cure the coating. In an appropriate modification, a part of the injection mould which is in contact with the reactive mixture is advantageously heated, and a part of the injection mould which is not in contact with the reaction mixture is not heated.

In this context, it should be specified that the term "injection mould" used herein is known in the specialist field. This is generally understood to mean the part of an injection moulding system which is needed for shaping. This part forms a cavity which can be filled with moulding material. After the cooling of the moulding material, the injection mould can be opened without destruction, such that the resulting moulding can be removed from the injection mould. The injection mould therefore typically comprises moving parts which enable such opening. For shaping, the injection mould typically has a metal part which comes into contact with the moulding material, and so this part or the surface of this part is of crucial significance for the shaping. For the inventive purposes, the term "injection mould" is understood especially to mean the shaping part, which may be composed of several parts. The heating detailed above means that the part of the injection mould in contact with the reactive mixture is actively heated very selectively. This can be effected especially by induction, by current flow or by means of heating elements which are in contact with this part of the injection mould. The fact that other parts of the injection mould may likewise be heated by this heating as a result of heat transfer is unimportant for this purpose, since a heat gradient is generally obtained, with the surface of the injection mould in contact with the reactive mixture having a higher temperature than the surface of the injection mould not in contact with the reactive mixture.

The temperature of at least one part of the injection mould is preferably increased by at least 5° C., more preferably by at least 10° C. and most preferably by at least 30° C. In the case of heating by means of an indirect heating element, these figures are based especially on the temperature possessed by a heating element which is in contact with at least one part of the injection mould and heats it. In the case of heating by means of induction or a current passed through the injection mould, these figures are based on the maximum temperature possessed by the injection mould.

This temperature increase can preferably be achieved within a short time span. This temperature increase can preferably be effected within 1 minute, more preferably within 30 seconds and most preferably within 5 seconds. Particularly short times are desired here, although these are limited by the technical circumstances.

In the particularly preferred embodiment, the temperature of at least one part of the injection mould is altered by more than 10° C. within 1 minute.

Compared to the prior art, the coated mouldings produced in accordance with the invention have novel, improved properties. According to the invention, at the time of injection of the reactive mixture, the moulding has a temperature of at least 70° C. The reactive mixture is hardened for not more than 1 min, more preferably 5 s, after injection at a temperature of at least 100° C. These high temperatures, in particular of the moulding to be coated, lead to particularly strong adhesion of the coating on the moulding. This effect is enhanced by the fact that the moulding, after production thereof from the moulding material, has at no time been cooled below a temperature of 70° C. and thus—according to the moulding material—formation of fine structures such as crystals is suppressed or delayed. These effects give rise to the possibility of achieving improved adhesion compared to the prior art at the interface between moulding and coating. It has been found that, surprisingly, this particular property of the mouldings produced in accordance with the invention is achievable only by virtue of the process according to the invention with no change in machinery.

The injection mould, or the surface of the injection mould, can be heated before, during or after the injection of the reactive mixture. Particular advantages can be achieved especially by commencing the heating of the injection mould actually before or during the injection of the reactive mixture. Preferably the maximum of the heating power by which the surface of the injection mould facing the moulding is heated may preferably be within a range which begins at the time of the minimum temperature of the uncoated moulding and ends less than 3 seconds, preferably less than 1 second, after the injection of the reactive mixture. In a particular aspect of the present invention, the maximum of the heating power by which the surface of the injection mould facing the moulding is heated may be attained before or during the injection of the reactive mixture. By virtue of this configuration, it is surprisingly possible to obtain surfaces with a particularly low level of cracking on the mouldings, which can be demoulded particularly readily.

In addition, the commencement and the rate of polymerization (curing) of the reactive mixture can be adjusted by the selection of the type and of the proportion of the thermal initiator, and by the selection of the mould temperature. In addition, the commencement of curing can be controlled by the selection of the polyfunctional (meth)acrylates present in the reaction mixture.

Systems which in principle enable coating with a reactive mixture are detailed inter alia in documents JP 11300776 and JP 2005074896 described above. For disclosure purposes, these publications are incorporated into this application. However, these publications do not describe any of these systems in which the temperature of at least one part of the injection mould can be altered by more than 10° C. within 1 minute. Such systems are disclosed in DE 102007051482. The system preferably enables an alteration of the temperature of at least one part of the injection mould by more than 10° C., more preferably more than 20° C., within 5 seconds.

These configurations are achieved inter alia by the possibility of heating at least one part of the injection mould by electrical current. Injection moulding systems with an electrically heatable injection mould are detailed inter alia in EP-A-1 065 037, WO 96/29188 and U.S. Pat. No. 5,234,627, which are incorporated for disclosure purposes. The heating can be effected here directly by heating the surface with electricity, or indirectly by induction or a heating element connected to the shaping surface of the injection mould. Preference is given here to indirect processes. Especially suitable is a ceramic heating element or a Peltier element. It is possible here to heat the injection mould by means of one or more of the processes detailed above.

The heating of an injection mould by induction is detailed inter alia in publication DE 201 21 777 U1. For the purposes of disclosure, this publication is incorporated into the present application.

Peltier elements are electrothermal transducers which generate a temperature difference in the event of current flow, or current flow in the event of a temperature difference. A customary abbreviation for Peltier elements and Peltier coolers is TEC (thermoelectric coolers). These elements can be obtained commercially.

Ceramic heating elements comprise a ceramic which can be heated by electricity. In this context, ceramic refers to inorganic materials which may include oxides, nitrides and similar substances, among others. Examples of such materials are inter alia in WO 00/34205, DE 35 483, DE 35 19 437 and DE 37 34 274. These publications are incorporated into this application for the purposes of disclosure.

In a particular embodiment, the injection nozzle through which the reactive mixture is injected into the injection mould may be equipped with a Peltier element. This achieves surprising advantages with regard to the service lives of the system. These can be achieved especially by virtue of the side of the nozzle facing the injection mould being heated, and the side of the nozzle facing away from the injection mould being cooled.

A preferred system for performing the process according to the invention has a cooling system by means of which at least one part of the injection mould can be cooled. The cooling can be effected especially by means of known coolants, for example air, water or similar media. The coolant is preferably passed through channels which run close to the heated injection mould. In the case of heating of the injection mould by induction, the cooling channels may run directly through the injection mould or be provided at the surface arranged opposite the surface of the injection mould with which the polymer moulding is shaped. In the case of indirect heating of the injection mould, for example by means of ceramic elements or by means of Peltier elements, coolant channels may be provided between the heating element and the surface of the injection mould with which the polymer moulding is shaped. If the injection mould is heated directly by electricity, the coolant channels may run directly through the injection mould or be provided at the surface arranged opposite the surface of the injection mould with which the polymer moulding is shaped.

After the intermediate space between the internal surface of the injection mould and the surface of the moulding has been filled with a reactive mixture, the mould is closed with reduced pressure, in order to impress the fully or partly structured surface of the inner surface of the injection mould on the coating which forms. The reduced pressure is normally below the machinery-related closing force. The coating is preferably embossed from the reactive mixture with a pressure between 20 and 100 bar, more preferably between 20 and 80 bar.

The moulding is notable especially for a high scratch resistance, which can be determined, for example, with a friction wheel test. Of particular interest are especially coated transparent mouldings, the haze value of which for the unstructured regions, according to a scratch resistance test to ASTM 1044 (12/05) (applied weight 500 g, number of cycles=100), increases by at most 10%, more preferably by at most 6% and most preferably by at most 3%. Scratch resistance to ASTM 1044 (12/05) (applied weight 500 g, number of cycles=100) can additionally be measured by the decrease in gloss at 20°. In this context, preferred coated mouldings exhibit a decrease in gloss at 20° by a scratch resistance test to ASTM 1044 (12/05) (applied weight 500 g, number of cycles=100) of at most 10%, more preferably by at most 6% and most preferably by at most 3%. The decrease in gloss at 20° can be determined to DIN EN ISO 2813. The determination of a change in gloss can be used, for example, to measure the scratch resistance of coloured mouldings or of coloured coatings.

In addition, the inventive mouldings exhibit an outstanding bond strength of the coating, which can be examined by the cross-cut test. For this purpose, the coating is etched in a crossed pattern and thus divided into individual segments in the manner of a chess board. In general, at least 20 individual segments are formed here, preferably at least 25 individual segments. The separation of the lines here is about 1 mm. Then an adhesive tape of width 25 mm is stuck on and pulled off again. The detaching power of the adhesive tape per cm$^2$, measured to DIN EN ISO 2409, is approx. 10 N per 25 mm of width. To perform the test, it is possible, for example, to use an adhesive tape obtainable under the trade name 4104 from Tesa. The coated mouldings preferably achieve a rating by the cross-cut test of at most 1, more preferably of 0. A rating of 1 is achieved by the coated mouldings if not significantly more than 5% of the individual segments are detached. If none of the individual segments (0%) are detached, the coated mouldings achieve a rating of 0.

Furthermore, preferred coatings are free of cracks and exhibit a high chemical resistance. For instance, the coatings withstand especially ethanol, ethanol/water (70/30), benzine, pancreatin, sulphuric acid (1%), contact with these compounds not resulting in any stress cracks.

Preferred mouldings may have a modulus of elasticity greater than or equal to 1200 MPa, preferably greater than or equal to 1600 MPa, to ISO 527 (at 1 mm/min). In addition, inventive mouldings may have a Charpy impact resistance greater than or equal to 10 kJ/m$^2$, preferably greater than or equal to 15 kJ/m$^2$, to ISO 179.

In addition, it is possible to obtain polymers with tensile strengths greater than or equal to 55, preferably greater than or equal to 60, to DIN 53 455-1-3 (at 1 mm/min), which have excellent scratch resistance.

In addition, the mouldings of the present invention may exhibit outstanding weathering stability. For instance, the weathering stability according to the xenon test is preferably at least 1000 hours, more preferably at least 2000 hours. This stability can be determined, for example, by virtue of a small decrease in transmittance or by virtue of a small decrease in scratch resistance. Of particular interest are especially coated mouldings whose transmittance after 2000 hours of xenon irradiation decreases at most by 10%, more preferably by at most 5%, based on the transmission value at the start of irradiation. In addition, preferred mouldings may exhibit an increase in the haze value after a scratch resistance test to ASTM 1044 (12/05) (applied weight 500 g, number of cycles=100) to at most 25%, more preferably to at most 15%, after xenon irradiation for 2000 hours. In addition, determination of the scratch resistance after xenon irradiation is also possible via the decrease in gloss. In this context, preferred coated mouldings exhibit a decrease in gloss at 20° C. after a scratch resistance test to ASTM 1044 (12/05) (applied weight 500 g, number of cycles=100) of at most 25%, more preferably by at most 20% and most preferably by at most 15%, after xenon irradiation for 2000 hours.

In addition, preferred coatings which have been obtained with an inventive coating composition exhibit a high stability in an alternating climate test, only minor crack formation occurring in spite of a deformation of the substrate. To perform the alternating climate test, it is possible with preference to use the stress programme described in the document "BMW PR 303—Teil d".

In a particularly preferred embodiment, nanostructures are embossed with the coating step. The nanostructured mouldings which are, for example, scratch-resistant give a coating which is glossy to the human eye, but have anti-dazzle properties as a result of the nanostructuring.

The invention claimed is:

1. A process for producing a coated moulding, the process comprising: injection moulding a moulding material into an injection mould, to obtain a moulding; and then
performing an expansion-flooding-embossing process in the same injection mould, to obtain a coated moulding, the coating comprising a multifunctional structured surface alongside a high-gloss surface.

2. The process of claim 1, wherein the multifunctional structured surface is nanostructured and the high-gloss surface is multifunctional.

3. The process of claim 1, the process comprises:
(I) injecting the moulding material at a temperature between 220 and 330° C. into the injection mould, which comprises a fully or partly structured inner surface, and cooling the moulding material to a demoulding temperature, to obtain the moulding;
(II) modifying the injection mould, to form an intermediate space in the injection mould having a thickness between 2μm and 500μm between a surface of the moulding to be coated and an inner surface of the injection mould;
(III) liquid injecting a reactive mixture into the intermediate space, thereby filling the intermediate space, at least partially, with the reactive mixture;
(IV) closing the injection mould heating the injection mould to a temperature between 80 and 140° C. for not more than 20 seconds, to obtain a coated mould; and then,
(V) cooling and opening the injection mould, and removing the coated moulding from the injection mould.

4. The process of claim 3, wherein, within 5 to 8 seconds after closing the mould in (IV), the injection mould is heated to the temperature between 100 and 140° C.

5. The process of claim 3, wherein, before the liquid injection (III), the injection mould is modified by replacing a cavity of the injection mould with a different cavity.

6. The process of claim 5, the modifying is carried out with a sliding table.

7. The process of claim 3, wherein the intermediate space has a thickness between 5μm and 80μm.

8. The process of claim 7, wherein the reactive mixture comprises:
at least 40% by weight of a di(meth)acrylate;
at least 10% by weight of a tri-, tetra-, or penta(meth)acrylate; and
0.01 to 3.0% by weight of a thermal initiator.

9. The process of claim 8, wherein the reactive mixture does not comprise at least one selected from the group coating of a lubricant and a mould release agent.

10. The process of claim 3, the moulding material comprises at least 50% by weight of polymethyl methacrylate, a polymethacrylmethylimide, a polymethyl methacrylate copolymer, or any combination thereof.

11. The process of claim 3, wherein the reactive mixture has a dynamic viscosity in a range from 1 to 200 mPa*s at 25° C.

12. The process of claim 11, wherein a maximum heating power which a surface of the injection mould facing the moulding is heated is attained before or during the liquid injecting (III).

13. The process of claim 3, wherein a maximum heating power by which the surface of the injection mould facing the moulding is heated is within a period which begins at a time of a minimum temperature of the moulding and ends less than 1 second after the liquid injecting (III).

14. The process of claim 3, wherein, during (I), the moulding is cooled to a temperature between 70 to 90° C.

* * * * *